(12) United States Patent
Robinson et al.

(10) Patent No.: US 11,530,332 B1
(45) Date of Patent: Dec. 20, 2022

(54) BIOBASED AQUEOUS POLYURETHANE DISPERSIONS

(71) Applicant: Evoco Limited, Toronto (CA)

(72) Inventors: Jason James Robinson, Toronto (CA); Nina Heidarzadeh, North York (CA); Radu Lucian Vicol, Toronto (CA); Ayodele Fatona, Hamilton (CA); Adel Kakroodi, Toronto (CA); Guerino G. Sacripante, Oakville (CA)

(73) Assignee: Evoco Limited, Toronto (CA)

( * ) Notice: Subject to any disclaimer, the term of this patent is extended or adjusted under 35 U.S.C. 154(b) by 0 days.

(21) Appl. No.: 17/862,461

(22) Filed: Jul. 12, 2022

(51) Int. Cl.
*C09D 175/06* (2006.01)
*C08G 63/60* (2006.01)
(Continued)

(52) U.S. Cl.
CPC ....... *C09D 175/06* (2013.01); *C08G 18/0866* (2013.01); *C08G 18/4238* (2013.01); *C08G 18/4286* (2013.01); *C08G 63/16* (2013.01); *C08G 63/60* (2013.01); *D06N 3/0006* (2013.01); *D06N 3/0047* (2013.01); *D06N 3/0088* (2013.01); *D06N 3/145* (2013.01); *D06N 3/146* (2013.01); *D06N 3/147* (2013.01);
(Continued)

(58) Field of Classification Search
None
See application file for complete search history.

(56) References Cited

U.S. PATENT DOCUMENTS

2008/0175875 A1\* 7/2008 Sunkara ............... A61K 8/04
424/78.03
2014/0099848 A1\* 4/2014 Mather ................ A61K 8/87
424/70.2

\* cited by examiner

*Primary Examiner* — Jeffrey D Washville

(57) ABSTRACT

An aqueous polyurethane dispersion includes particles of polyurethane in water, wherein the polyurethane is derived from an organic diisocyanate, a hydrophilic monomer, a neutralizer, a chain extender, and a polyester resin, the polyester resin being a random copolymer having randomly distributed subunits of formula 1:

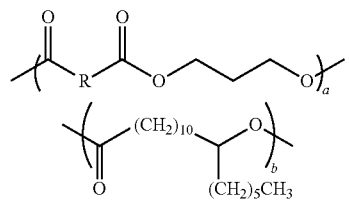

(Continued)

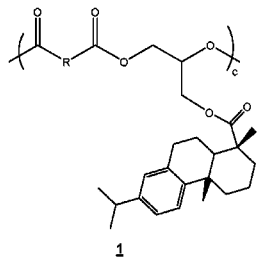

1 where:
R is ethylene, octylene, or decylene,
a is from about 40 to about 100 mole % of the polyester resin,
b is from 0 to about 30 mole % of the polyester resin,
c is from 0 to about 30 mole % of the polyester resin, and
a + b + c = 100 mole % of the polyester resin.

-continued
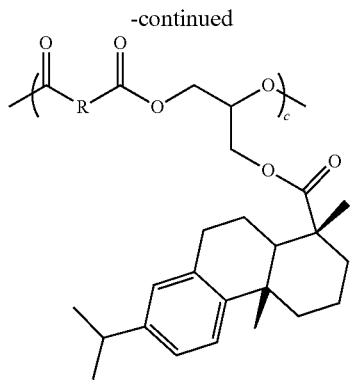
where: R is ethylene, octylene, or decylene, a is from about 40 to about 100 mole % of the polyester resin, b is from 0 to about 30 mole % of the polyester resin, c is from 0 to about 30 mole % of the polyester resin, and a+b+c=100 mole % of the polyester resin.
27 Claims, 1 Drawing Sheet
(51) Int. Cl.
| | |
|---|---|
| *C08G 18/08* | (2006.01) |
| *C08G 18/42* | (2006.01) |
| *D06N 3/00* | (2006.01) |
| *D06N 3/14* | (2006.01) |
| *D06N 3/18* | (2006.01) |
| *C08G 63/16* | (2006.01) |
(52) U.S. Cl.
CPC ....... *D06N 3/183* (2013.01); *D06N 2201/042* (2013.01); *D06N 2203/068* (2013.01); *D06N 2205/02* (2013.01); *D06N 2205/045* (2013.01); *D06N 2209/142* (2013.01); *D06N 2209/1642* (2013.01)

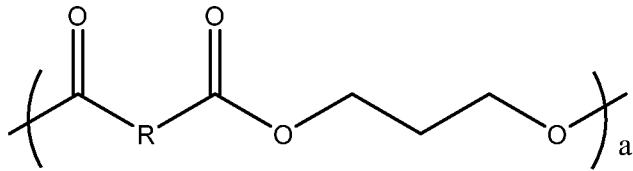
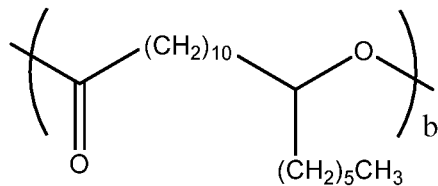
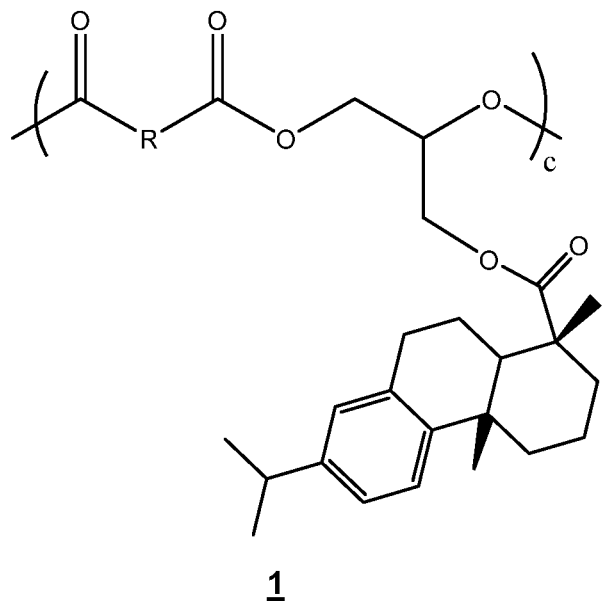
1
where:
R is ethylene, octylene, or decylene,
a is from about 40 to about 100 mole % of the polyester resin,
b is from 0 to about 30 mole % of the polyester resin,
c is from 0 to about 30 mole % of the polyester resin, and
a + b + c = 100 mole % of the polyester resin.

BIOBASED AQUEOUS POLYURETHANE DISPERSIONS

FIELD

The present invention relates generally to polyurethane and in particular, to biobased aqueous polyurethane dispersions.

BACKGROUND

Aqueous polyurethane dispersions (PUD), sometimes referred to as "waterborne" polyurethane dispersions, are binary colloidal systems in which submicron-sized polyurethane particles are dispersed in a continuous aqueous medium. Aqueous polyurethane dispersions typically contain no organic solvent, and thereby satisfy increased demand for solventless systems for green technology applications. Aqueous polyurethane dispersions are typically produced by a dissipation or phase inversion process, whereby water is added to a polyurethane polymer or prepolymer comprising hydrophilic (ionic) groups in the polyurethane backbone. These ionic moieties are referred to as internal emulsifiers or polyurethane ionomers, and can be for example quaternary ammonium, carboxylate, or sulfonate groups. In some instances, low boiling point-point organic solvents are utilized in the polymer/ prepolymer mixture but are then removed by distillation after the aqueous dispersion is formed. Chain extenders and crosslinkers may be added, before or after the aqueous dispersion is formed, to achieve varying degrees of polymerization of the polyurethane.

Aqueous polyurethane dispersions are important for many industrial applications such as coatings, adhesives, ink binder, glass fibers, paper sizing, biomaterials, membranes, films for packaging, waterproof textiles, and as plant-based leather alternatives (PBLA). Plant-based leather alternatives are materials intended to serve as substitutes for natural (namely, animal-based) leather for use in upholstery, clothing, footwear, and other uses in which a leather-like finish is desired. Plant-based leather is sometimes referred to as leatherette, imitation leather, faux leather, vegan leather, or PU leather.

Aqueous polyurethane dispersions have been described. For example, U.S. Pat. No. 5,401,582 to Weyland et al. describes a method for the preparation of aqueous polyurethane formulations containing from 10 to 60% by weight of one or more polyurethanes as a bottoming coat for finishes on leathers. The aqeuous dispersion is prepared by first forming a polyurethane polymer from the reaction of a diisocyanates such as 2,4-diisocyanatotoluene, a polyol such as polypropylene glycol, a hydrophilic monomer such as dimethylolpropionic acid, and a catalyst such as dibutyltin dilaurate. Thereafter are added a solvent such as acetone, a neutralizing agent such as triethylamine, and water. After removal of the acetone by distillation, a clear aqueous polyurethane dispersion is obtained.

U.S. Pat. No. 7,271,216 to Tanaka et al. describes a method for the preparation of an aqueous polyurethane dispersion, wherein a polyurethane prepolymer terminated with an isocyanate group is dispersed in water, followed by addition of a chain extender to complete the polyurethane polymerization of the aqueous dispersion.

U.S. Pat. No. 10,351,655 to Honcoop et al. describes a polyurethane dispersion comprising particles of a polyurethane dispersed in a dispersing medium, wherein the polyurethane is obtainable by reacting a polyol and an isocyanate, wherein the polyol comprises at least one dimer fatty residue selected from a dimer fatty diacid residue, a dimer fatty diol residue and a dimer fatty diamine residue; and at least one furan dicarboxylic acid residue.

The main components of polyurethane, namely polyols and diisocyanates, are mainly derived from petrochemicals, and their production contributes heavily towards greenhouse gasses that negatively impact the environment. There is a need for aqueous polyurethane dispersions that have components based on renewable resource materials derived primarily from biomass, such that there is less dependency on fossil fuels that otherwise accelerate climate change.

There is also a need to provide aqueous polyurethane dispersions that are derived primarily from biomass-based materials, such as biobased polyols and preferably biobased diisocyanates, and wherein no organic solvents are present in the aqueous polyurethane dispersion.

There is also a need to provide aqueous polyurethane dispersions that are high in bio-derived content, such as from about 80 to about 100 weight %.

Further, there is a need for a plant-based leather alternative comprised of a natural bio-derived substrate coated with a biobased aqueous polyurethane dispersion, wherein the total bio-derived content is from about 90 to about 100 weight %.

SUMMARY

This disclosure is generally directed to biobased aqueous polyurethane dispersions that can be generated by a phase inversion process, whereby water is added to an ionic polyurethane prepolymer capped with isocyanate groups, optionally with a low boiling point organic solvent such as acetone or methyl ethyl ketone and optionally with an ionic or non-ionic surfactant, followed by addition of a biobased chain extender to complete the polymerization of the prepolymer to polyurethane. The ionic polyurethane prepolymer is generated by reaction of a biobased polyol, in particular a polyester polyol, a hydrophilic (ionic) monomer such as dimethylol propionic acid, and a slight excess of diisocyanate, such that the ionic polyurethane prepolymer is capped with isocyanate end groups. Prior to the addition of water for phase inversion, a trialkyl amine such as triethylamine is added to neutralize the carboxylic acid moieties of the ionic polyurethane prepolymer. The biobased aqueous polyurethane dispersion is useful for plant-based leather alternatives, coatings, adhesives and sheet materials, for example.

There is also disclosed herein an aqueous polyurethane dispersion having a solids content (namely, the amount of polyurethane particles) of from about 20 to about 60 weight % of the dispersion, wherein water accounts for the remaining weight % of the dispersion, where the total of the amount of polyurethane resin particles and the amount of water is 100 weight %.

Additionally, there is disclosed herein an aqueous polyurethane dispersion in which the particle size of the polyurethane resin particles is from about 40 to about 500 nanometers, preferably from about 40 to 300 nanometers, and more preferably from about 50 to about 240 nanometers.

There is also disclosed herein an aqueous polyurethane dispersion comprising a polyurethane having a bio-content of from about 50 to about 97 weight %, preferably from about 80 to about 97 weight %, and more preferably from about 85 to about 95 weight %.

Additionally, there is disclosed herein aqueous polyurethane dispersions that provide hydrophobic coatings, wherein the contact angle of the coatings is from about 90 to about 120°.

Accordingly, in one aspect there is provided an aqueous polyurethane dispersion comprising particles of polyurethane in water, wherein the polyurethane is derived from an organic diisocyanate, a hydrophilic monomer, a neutralizer, a chain extender, and a polyester resin, the polyester resin being a random copolymer having randomly distributed subunits of formula 1, shown in FIG. 1, where: R is ethylene, octylene, or decylene, a is from about 40 to about 100 mole % of the polyester resin, b is from 0 to about 30 mole % of the polyester resin, c is from 0 to about 30 mole % of the polyester resin, and a+b+c=100 mole % of the polyester resin.

In the aqueous polyurethane dispersion, a may be from about 70 to about 100 mole % of the polyester resin, b may be from 0 to about 30 mole % of the polyester resin, and c may be from 0 to about 30 mole % of the polyester resin.

The particles may have a diameter of from about 40 to about 500 nanometers. The particles may have a diameter of from about 50 to about 220 nanometers.

The polyester resin of formula 1 may have a number average molecular weight of from about 500 to about 5,000 grams per mole The polyester resin of formula 1 may have a glass transition temperature of from about −30° C. to about 50° C.

The particles of polyurethane may be from about 10 to about 60 weight % of the dispersion, and water may be from about 40 to about 90 weight % of the dispersion, where the sum of the weight percentages of the particles and water is 100 weight %.

The polyester resin of formula 1 may have a hydroxyl number of from about 30 to about 80 milligrams of KOH/gram.

The polyester resin of formula 1 may have an acid number of less than about 3 milligrams of KOH/gram.

The polyester resin of formula 1 may be derived from at least one organic diol selected from the group consisting of 1,3-propanediol, 1,2-propylene glycol, rosin diol, 1,4-butane diol, and 1,6-hexanediol.

The rosin diol may be derived from at least one rosin acid selected from the group consisting of abietic acid, palustric acid, dehydroabietic acid, neo-abietic acid, levo-pimaric acid, pimaric acid, sandaracopimaric acid, iso-pimaric acid, tetrahydroabietic acid, and mixtures thereof.

The polyester resin of formula 1 may be derived from at least one organic diacid selected from the group consisting of succinic acid, sebacic acid, dodecanedioic acid, and dimer organic diacid.

The polyester resin of formula 1 may be generated from reaction of an organic diacid, an organic acid-alcohol and an organic diol, and wherein said organic diacid is selected from the group consisting of succinic acid and sebacic acid, said organic acid-alcohol is selected from the group consisting of 12-hydroxystearic acid and 1,12-dodecanedioic acid, and said organic diol is selected from the group consisting of 1,3-propanediol and rosin diol.

The polyester resin of formula 1 may be derived from an organic acid-alcohol that is 12-hydroxystearic acid.

The polyester resin of formula 1 may be derived from 1,3 propanediol, succinic acid, 12-hydroxystearic acid, and a rosin diol.

The organic diisocyanate may be selected from the group consisting of 1,5 pentamethylene diisocyanate, diphenylmethane 4,4′-diisocyanate, isophorone diisocyanate, dicyclohexylmethane 4,4-diisocyanate, hexamethylene 1,6-diisocyanate, naphthalene 1,5-diisocyanate, and mixtures thereof.

The hydrophilic monomer may be selected from the group consisting of dimethylol propionic acid, 5-sulfoisophthalic acid sodium salt, dimethyl-5-sulfoisophthalic acid sodium salt, and mixtures thereof.

The chain extender may be selected from the group consisting of polyhydric alcohols, ethylene glycol, 1,3-propanediol, 1,4-butanediol, 1,6-hexanediol, rosin diol, isosorbide, polyhydric amines, ethylenediamine, 1,5-pentamethylene 1,6-hexamethylene diamine, lysine, hydrazine, rosin diol, and mixtures thereof.

The neutralizer may be selected from the group consisting of ammonia, triethyl amine, trimethyl amine, tributyl amine, dimethyl amine, diethyl amine, and tri-ethanol amine.

The polyurethane may further comprise a surfactant. The surfactant may be selected from the group consisting of a polyether-silicone oil, a silicone surfactant of sodium dodecylbenzene sulfonate, sodium dodecylnaphthalene sulfate, dialkyl benzenealkyl, adipic acid, polyvinyl alcohol, polyacrylic acid, methalose, methyl cellulose, and ethyl cellulose, and bioloop.

The polyurethane may further comprise a colorant. The colorant may be dye or pigment.

In one embodiment, there is provided a polymeric film formed by coating a substrate with the any of the above-described aqueous polyurethane dispersion, wherein after coating the substrate, the substrate is heated from about 80° C. to about 120° C. to form the polymeric film.

The polymeric film may have a contact angle of from about 70° to about 150°.

The polymeric film may have a hardness value of from about 15 to about 60 Asker C, a tensile strength of from about 1 to about 10 MPa, a resilience of from about 25 to about 60%, an elongation at break of from about 150 to about 700%, and a tear strength of from about 2 to about 4 N/mm$^2$.

The bio-content of the polyurethane may be from about 70 to about 85%.

In still another embodiment, there is provided an artificial leather comprising: a fabric layer; a binder layer on the fabric layer; a foam layer on the binder layer; and a topcoat layer on the foam layer, wherein the binder layer, the foam layer and the topcoat layer are each formed from any of the above-described aqueous polyurethane dispersion.

The binder layer may have a thickness of from about 0.01 to about 0.03 mm, the foam layer has a thickness of from about 0.05 to about 0.5 mm. and the topcoat layer has a thickness of from about 0.01 to about 0.03 mm.

BRIEF DESCRIPTION OF THE DRAWING

Embodiments will now be described more fully with reference to the accompanying drawing in which:

FIG. 1 is a structural view of a polyester (polyol) resin of formula 1.

DETAILED DESCRIPTION OF THE INVENTION

The present invention is directed to aqueous polyurethane dispersions, sometimes referred to in the art as "waterborne" polyurethane dispersions, comprising particles of polyurethane in water, wherein the polyurethane is derived from an organic diisocyanate, a hydrophilic monomer, a neutralizer, a chain extender, and a polyester resin. The aqueous polyurethane dispersions may be used, for example, for plant-based leather alternatives, coatings, adhesives and sheet materials.

FIG. 1 shows a polyester resin for use with the present invention. The polyester resin is a random copolymer having randomly distributed subunits of formula 1, where R is ethylene, octylene, or decylene, a is from about 40 to about 100 mole % of the polyester resin, b is from 0 to about 30 mole % of the polyester resin, c is from 0 to about 30 mole % of the polyester resin, and a+b+c=100 mole % of the polyester resin.

In a preferred embodiment, the polyester resin is derived from a mixture of a biobased organic diacid, at least one biobased diol, and an optional organic acid-alcohol, in the presence of a polycondensation catalyst. The biobased organic diacid comprises one or more of succinic acid, sebacic acid, and dodecanedioic acid. The biobased diol comprises one or both of 1,3-propanediol and rosin diol. The organic acid-alcohol comprises 12-hydroxystearic acid. The resulting biobased polyester resin, obtained from the biobased organic diacid, the biobased diol, and the optional organic acid-alcohol, comprises randomly distributed subunits (sometimes referred to in the art as "segments") whereby, with reference to formula 1 shown in FIG. 1, subunit a represents the condensation product of the organic diacid with 1,3-propanediol, subunit b represents the condensation product of the organic diacid with 12-hydroxystearic acid, and subunit c represents the condensation product of the organic diacid with rosin diol. As will be understood, the polyester resin is also described herein as a polyester polyol, since the polyester end groups are hydroxyl moieties.

The polyester resin of this invention has been observed to impart a degree of hydrophobicity in polyurethane coatings derived therefrom, as characterized by contact angle measurement. As is known in the art, contact angle measurement is a quantitative way to evaluate whether a surface has a hydrophobic or hydrophilic characteristic. Contact angle is based upon intermolecular interaction between the surface and a droplet of liquid on the surface. Specifically, the contact angle is the angle a liquid-vapor interface forms on a solid surface, and therefore the contact angle quantifies the wettability of the solid surface by the liquid. Contact angle can be measured in accordance with the methodology of ASTM D7334-08 "Standard Practice for Surface wettability Coatings, Substrates and Pigments by Advancing Contact Angle Measurements". Generally, if a water contact angle is lower than 90°, the solid surface is considered hydrophilic, while if the water contact angle is greater than 90°, the solid surface is considered hydrophobic.

The aqueous polyurethane dispersion of this invention can be used to form a foam or coating, or utilized as a binder, for a variety of substrates, surfaces, sheet materials and the like, especially on plant-based leather alternative substrates such as cotton canvas, cotton twill, cotton chintz, cotton basket weave, cotton poplin, natural linen, hemp, mycelium, fruit-based fibers such as from pineapple and apple, coffee grind, collagen, and cork. Each of the foam, coating and binder layer(s) can be deposited as an individual layer by a suitable method such as doctor blade wiping, spin coating, spray deposition, and the like. Other deposition or coating methods can also be used.

Embodiments

Polyester (Polyol) Resins

The polyester resin of formula 1 can be prepared by a polycondensation process by reacting at least one organic diol, an organic diacid and an optional organic acid-alcohol in the presence of a polycondensation catalyst. Generally, a stoichiometric equimolar ratio of organic diol and organic diacid is used, however, an excess of organic diol can be used so that the resulting polymer displays a hydroxyl number of from about 30 to about 80, an acid number of less than about 3 milligrams/gram of KOH, preferably less than about 1 milligrams/gram of KOH, and a molecular weight average of from about 1,500 to about 5,000 Daltons as determined by GPC. In some instances, where the boiling point of the organic diol is from, for example, about 180° C. to about 230° C., an excess amount of diol, such as an alkylene glycol (for example, 1,3-propanediol), of from about 0.2 to 1 mole equivalent can be utilized and removed during the polycondensation process by distillation. The amount of catalyst can vary, and can be, for example, from about 0.01 to about 1% by weight, or from about 0.01 to about 0.05% by weight, of the polyester resin.

Examples of organic diacids or diesters, which can be those obtained through a fermentation process, or natural sources such as those chemically derived from natural (biobased) sources, selected for preparation of the polyester resins include succinic acid, sebacic acid, and dodecanedioic acid. The organic diacid is selected in an amount of, for example, from about 35 to about 60% by weight, and preferably from about 45 to about 50% by weight of the polyester resin.

The organic acid-alcohol, which can be those obtained through a fermentation process, or natural sources such as those chemically derived from natural (biobased) sources, selected for preparation of the polyester resins includes 12-hydroxystearic acid.

The organic diols, which can be those obtained through a fermentation process, or natural sources such as those chemically derived from natural (biobased) sources, selected for preparation of the polyester resins include 1,3-propanediol and rosin diol. The rosin diol can be prepared by reaction of a rosin acid (dehydroabietic acid) with glycerol, and is available as Altamer RDA from Ingevity. The rosin diol can also be prepared by reaction of a rosin acid and glycerin carbonate, as disclosed by Sacripante et al., in "Sustainable Polyester Resins Derived from Rosins", Macromolecules 48, p. 6876-6881 (2015). The rosin acid can be selected from the group consisting of abietic acid, palustric acid, dehydroabietic acid, neo-abietic acid, levo-pimaric acid, pimaric acid, sandaracopimaric acid, iso-pimaric acid, tetrahydroabietic acid, and mixtures thereof.

Other diacids and organic diols may also be present, in addition to the organic diacids, optional organic acid-alcohol, and organic diols noted above. For example, the polyester resin may be derived from an additional organic diacid selected from the group consisting of dimer organic diacids and polymerized fatty acids. The polyester resin may be derived from an organic diol diacid selected from the group consisting of 1,2-propylene glycol, 1,4 butanediol, 1,6-hexanediol, isosorbide, and mixtures thereof.

Polycondensation catalysts utilized for the preparation of the polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), titanium triethanolaminate or mixtures thereof, and other known suitable catalysts. The catalysts may be in amounts of, for example, from about 0.01 to about 5% by weight, preferably from about 0.1 to about 0.8% by weight, and more preferably from about 0.2 to about 0.6% by weight, based on the starting weight of the organic diacid or diester used to generate the polyester resin.

The polyester resins of this invention, as illustrated in FIG. 1, include poly-(1,3-propylene-succinate), poly-(1,3-propylene-sebacate), poly-(1,3-propylene-succinate), poly-(1,3-propylene-dodecanoate), copoly-(1,3-propylene-succinate)-copoly-(1,3-propylene-sebacate), copoly-(1,3-propylene-succinate)-copoly-(1,3-propylene-dodecanoate), copoly-(1,3-propylene-succinate)-copoly-(12-stearate), copoly-(1,3-propylene-sebacate)-copoly-(12-stearate), copoly-(1,3-propylene-succinate)-copoly-(rosin glyceryl-succinate), copoly-(1,3-propylene-sebacate)-copoly-(rosin glyceryl-sebacate), copoly-(1,3-propylene-dodecanoate)-copoly-(rosin glyceryl-dodecanoate), terpoly-(1,3-propylene-succinate)-terpoly-(12-stearate)-terpoly-(rosin glyceryl-succinate), terpoly-(1,3-propylene-sebacate)-terpoly-(12-stearate)-terpoly-(rosin glyceryl-sebacate), terpoly-(1,3-propylene-dodecanoate)-terpoly-(12-stearate)-terpoly-(rosin glyceryl-dodecanoate), mixtures thereof, and mixtures thereof with other suitable known polyester resins.

The polyester resins may optionally have a melting point of less than 30° C., such as from about –10° C. to about 30° C. In general, the preferred polyester resin of the invention does not possess a melting point, but rather has a glass transition temperature of, for example, from about –25° C. to about 10° C.

The polyester resin, or mixtures comprising the polyester resin, can be present in the polyurethane in amounts of, for example, from about 25 to about 65% by weight, preferably from about 30 to about 55% by weight, and more preferably from about 40 to about 60% by weight, based on the weight of the polyurethane.

In preferred embodiments, the polyester resin of formula 1 is prepared by reacting a mixture of biobased diol such as 1,3-propanediol, in an amount of from about 20 to about 40 mole % of the polyester resin, and rosin diol in an amount from about 1 to about 30 mole % of the polyester resin, and a biobased organic acid-alcohol such as 12-hydroxystearic acid in an amount from about 1 to about 30 mole % of the polyester resin, with a biobased organic diacid such as one or more of succinic acid, sebacic acid, dodecanedioic acid, and mixtures thereof, in an amount of from about 45 to about 50 mole % of the polyester resin, in the presence of a polycondensation catalyst in an amount of from about 0.01 to about 0.1 mole % of the polyester resin, where the sum of all reactants is 100 mole % of the polyester resin. Note that an excess of 1,3-propanediol is initially added, and then removed by distillation during production of the polyester resin, so that the polyester end groups are primarily comprised of hydroxyl end groups; such that the resulting polymer displays a hydroxyl number of from about 30 to about 70, and an acid number of less than about 3 milligrams/gram of KOH, preferably less than about 1 milligrams/gram of KOH. Furthermore, in order to obtain a polyester resin with predominant hydroxyl end groups, the mole ratio of diol to organic diacid is from about 1.05 to about 1.3, and the excess amount of diol is removed by distillation.

Aqueous Polyurethane Dispersion

The polyurethane can be derived of from about 40 to about 55 mole % of the polyester resin of formula 1, from about 1 to about 4 mole % of a chain extender, from about 1 to about 10 mole % of a hydrophilic (ionic) monomer, from about 1 to about 10 mole % of a neutralizing agent, from about 0.1 to about 0.5 mole % of a catalyst, optionally from about 0.5 to about 5% by weight of colorant of, for example, a dye, a pigment, or mixtures thereof, optionally from about 0.5 to about 3 mole % of surfactant, and from about 40 to about 50 mole % of an organic diisocyanate, where the sum of all components is 100 mole % of the polyurethane.

In one embodiment, the aqueous polyurethane dispersion is generated by a phase inversion process whereby water is added dropwise to an ionic polyurethane prepolymer, optionally with a surfactant and optionally with a low boiling point organic solvent such as acetone or methyl ethyl ketone (MEK) under agitation, optionally followed by distillation of the optionally added low boiling point organic solvent, to render the aqueous dispersion comprising polyurethane particles in water. The ionic polyurethane prepolymer is generated from reaction of the polyester resin of formula 1, a hydrophilic (ionic) monomer such as dimethylol propionic acid, a slight excess of diisocyanate (so that the resulting ionic polyurethane prepolymer is capped with isocyanate end groups), and a catalyst, at a temperature of from about 70 to about 90° C. for a duration of from about 120 to about 480 minutes. To this is then added a neutralizer, such as triethylamine, to neutralize the carboxylic acid moieties of the ionic polyurethane prepolymer.

Alternatively, in another embodiment, the aqueous polyurethane dispersion is generated by a phase inversion process whereby water is added dropwise to an ionic neutralized polyurethane prepolymer capped with isocyanate groups, optionally with a low boiling point organic solvent such as acetone or MEK, and optionally with an ionic or non-ionic surfactant. A chain extender is then added to complete the polymerization of the polyurethane, optionally followed by the distillation of the optionally added low boiling point organic solvent. The ionic polyurethane prepolymer is generated from the reaction of the polyester resin of formula 1, a hydrophilic (ionic) monomer such as dimethylol propionic acid, a slight excess of diisocyanate (so that the ionic polyurethane prepolymer is capped with isocyanate end groups), and a catalyst, at a temperature of from about 70 to about 90° C. for a duration of from about 120 to about 480 minutes. To this is then added a neutralizer, such as triethylamine, to neutralize the carboxylic acid moieties of the ionic polyurethane prepolymer.

In one embodiment, the ionic polyurethane prepolymer, capped with isocyanate end groups, can be prepared by reaction of the organic diisocyanate and the polyester resin of formula 1, with an NCO:OH molar ratio of from 1.1:1 to 3.5:1, and preferably of from about 1.3:1 to about 2.5:1. The isocyanate-terminated prepolymer is then blended and reacted with the remaining hydrophilic (ionic) monomer and chain extenders to yield the polyurethane. The polyurethane can also be prepared by reaction of polyurethane prepolymer comprising terminal isocyanate groups and a chain extender in the presence of a catalyst.

Chain Extenders

Examples of chain extenders having two or more hydroxyl groups that can be used include polyhydric alcohols, such as 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols such as ethylene glycol, propylene glycol, mono-ethylene glycol, diethylene glycol, mono-propylene glycol, di-propylene glycol, tri-methyol propane, pentaerythritol, rosin diol, isosorbide, and mixtures thereof, and the like, present in amounts of, for example, from about 0.1 to about 10% by weight, and preferably from about 0.1 to about 5% by weight, based on the weight of the polyurethane resin. Other known suitable chain extenders having two or more amine groups that can be used include, for example, aliphatic polyhydric amines such as ethylenediamine, 1,5-pentamethylene 1,6-hexamethylene diamine, lysine, hydrazine and mixtures thereof, and the like, present in amounts of, for example, from about 0.1 to about 10% by weight, and preferably from about 0.1 to about 5% by weight, based on the weight of the polyurethane.

Surfactants

Surfactants are utilized optionally to improve the colloidal stability of the aqueous dispersion, so that the polyurethane particles can be relatively uniformly dispersed and resistant to sedimentation during standing; in the event sedimentation does occur, the polyurethane particles can be easily redispersed by simple agitation. The surfactants that can be used are, for example, polyether-silicone oil mix (TEGOSTAB® B4113) available from Evonik, 8383, silicone surfactant DABCO DC® 193, and TEGOSTAB® B8383 available from Evonik, ORTEGOL 501 PF available from Evonik, sodium dodecylbenzene sulfonate, sodium dodecylnaphthalene sulfate, dialkylbenzenealkyl, sulfates and sulfonates, adipic acid, available from Aldrich, NEOGEN R™, NEOGEN SC™, available from Daiichi Kogyo Seiyaku, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, ANTAROX890™, and ANTAROX897™, Calfax® available from Pilot Chemical company, Dowfax™ available from Dow Chemicals, polyvinyl alcohol, polyacrylic acid, polyethylene glycol, Bioloop available from Lanke and other suitable known surfactants in amounts of, for example, from about 0.1 to about 10% by weight, and preferably from about 0.1 to about 3% by weight, based on the weight of the polyurethane.

Catalysts

Polycondensation catalysts utilized for the preparation of the polyester resins include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), mixtures thereof, and the like. The catalysts can be in amounts of, for example, from about 0.01 to about 5% by weight, preferably from about 0.1 to about 0.8% by weight, and more preferably from about 0.2 to about 0.6% by weight, with the percentage based on the starting amount of organic diacid or diester used to generate the polyester resin.

Examples of catalysts utilized for the preparation of the polyurethane, whereby the catalysts react with the organic diisocyanates, include, for example, known tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, DAPCO 33 LV (33% triethylenediamine dissolved in 67% dipropylene glycol), BICAT 8109 (bismuth neodecanoate), Jeffcat-Zf-54 (bis-(2-dimethylaminoethyl)ether in dipropylene glycol), KOSMOS® 75 MEG, and the like; and organometallic compounds, such as titanium (iv) isopropoxide (Tyzor TE), titanium diisopropoxide bis (triethanolamine available as ORGATIX TC-400, mixtures thereof, and the like. The total amount of catalysts selected is generally from about 0.1 to about 5% by weight, and preferably from about 0.1 to about 1% by weight, based on the polyurethane.

Colorants

The optional colorant that can be used in the preparation of the polyurethane may be present, for example, in amounts of from about 0.1 to about 5% by weight, and preferably from about 0.1 to about 3% by weight, based on the amount of the polyurethane. The optional colorant can be any of pigments, dyes, and the like, and mixtures thereof. Examples of colorants that can be used include inorganic pigments, such as carbon black, whiteners, such as titanium oxide which has weather resistance, and organic pigments and dyes, such as phthalocyanine blue, azo dyes, Indigo, Congo Red, Methyl Orange, Malachile Green, purple dyes, brown dyes, black dyes, Pigment Blue 15:3 or C.I. Pigment Blue 15:4, phthalocyanine green, quinacridone red, indanthrene orange, and isoindolinone yellow, C.I. Pigment Red 254 and C.I. Pigment Red 122, C.I. Pigment Yellow 151 and C.I. Pigment Yellow 74, Fates Dye and Keen Dye available from BAO Shen Polyurethane Tech.LTD-China, purple dyes, brown dyes, and other suitable known colorants, such as known dyes and pigments illustrated in the Colour Index (C.I.), and magenta, yellow, and cyan colorants.

Organic Diisocyanates

Examples of diisocyanates selected for the compositions and processes illustrated herein include aliphatic diisocyanates, such as 1,5-pentamethylene diisocyanate, hexamethylene diisocyanate, cycloaliphatic diisocyanates such as isophorone diisocyanate, cyclohexane 1,4-diisocyanate, 1-methylcyclohexane 2,4-diisocyanate, and 1-methylcyclohexane 2,6-diisocyanate, and the corresponding isomer mixtures, dicyclohexylmethane 4,4'-diisocyanate, dicyclohexylmethane 2,4'-diisocyanate, dicyclohexylmethane 2,2'-diisocyanate, and the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. Especially selected diisocyanates are hexamethylene 1,6-diisocyanate, cyclohexane 1,4-diisocyanate, isophorone diisocyanate, dicyclohexylmethane diisocyanate, diphenylmethane diisocyanates with more than 96% by weight content of diphenylmethane 4,4'-diisocyanate, diphenylmethane 4,4'-diisocyanate, and naphthylene 1,5-diisocyanate, suitable known diisocyanates, mixtures thereof, and other known suitable organic diisocyanates. In some embodiments, there can be selected mixtures of a diisocyanate and a polyisocyanate in an amount of up to about 15% by weight, based on the amount of polyurethane, however, up to about 40% by weight of polyisocyanate can be added, so as to provide an improved thermoplastically processable product. Examples of polyisocyanates include triisocyanates, biurets and isocyanurate trimer, such as for example, triphenylmethane 4,4',4"-triisocyanate and polyphenylpolymethylene polyisocyanates as well as hexamethylene diisocyanate (HDI) biuret trimer, isocyanurate trimer, and isophorone (IPDI) isocyanurate trimer.

The isocyanate is preferably used in molar excess relative to hydroxyl group content of the polyester resin, so as to obtain a reaction mixture containing isocyanate-terminated prepolymer and sufficient unreacted isocyanate, such that later addition of the chain extender can result in reaction to form the polyurethane, without requiring addition of further isocyanate.

Hydrophilic (Ionic) Monomer

The hydrophilic (ionic) monomer can be selected from the group consisting of dimethylol propionic acid, 5-sulfoisophthalic acid sodium salt, dimethyl-5-sulfo isophthalic acid sodium salt, and mixtures thereof. The amount of hydrophilic monomer used may be, for example, from about 1 to about 15% by weight, and preferably from about 1 to about 10% by weight, based on the amount of polyurethane.

Neutralizing agents

The neutralizing agents can be selected from the group consisting of trialkyl amine and tri-alkanol amines, and in particular from the group consisting of triethyl amine, trimethyl amine, tributyl amine, triethanol amine, and tributanol amine. The amount of neutralizing agent used is in equimolar ratio to the hydrophilic monomer comprising dimethyol propionic acid, and may be for example, from about 1 to about 15% by weight, and preferably from about 1 to about 10% by weight, based on the amount of polyurethane.

The characteristics and properties of polyurethane coatings obtained from the aqueous polyurethane dispersions can be measured as illustrated herein, and by known processes and devices. More specifically, the tensile tester may be the ADMET eXpert 7601 Tensile Tester, to measure tensile strength, elongation, tear strength and compression set, by preparing samples of the polyurethane in dog-bone shapes with a die cutter with a standard thickness of about 10 millimeters and a length of about 140 millimeters in accordance with the methodologies of the ASTM D412, ASTM D3574-17, and SATRA TM-2 standards. The sample is placed between clamps the tensile tester, and the tensile tester applies the appropriate force at a particular speed (generated by the software) on the test material sample to provide the characteristics, properties and values of the polyurethane products.

Density is measured using the equation Density=Mass/Volume, where mass represents the mass of the material in a mold measured on an analytical balance. Volume of the mold is obtained from the dimensions of the mold. For example, if a mold was producing 10 millimeters, or 1 centimeter polyurethane plaques with dimensions length equal to 21 centimeters width equal to 14.8 centimeters, and the thickness equal to 10 millimeters, then the volume is calculated to be 21 times 14.8 times 1 equals 310.80 centimeters$^3$.

The hardness is measured on the Asker C scale and can also be measured by a durometer.

The bio-content of the disclosed polyurethane elastomer foams can be determined by various methods. In one method, the bio-content can be measured as follows and where, for example, the polyester polyol, plasticizer, and chain extender can also impart bio-content characteristics to the polyurethane:

A) Add the total weight of the components/ingredients=X grams

B) Add the weight of the components ingredients that are biobased, the polyester resin plus the chain extender plus the plasticizer=Y grams C) Total bio-content=(Y/X)×100=the bio-content in %.

For example, if 100 grams of the polyester resin are selected and 5% by weight of the bio-additive/filler was added, then based on the polyester resin, the amount of the bio additive-based filler is 100×0.05=5 grams.

D) Total weight of ingredients including the bio-filler=Z grams

E) Weight of the biobased ingredients, which also includes the bio additive-filler=W grams F) New bio-content=(W/Z)x100=N. N represents the new bio-content with the biocide additive, or where the bio-content can be derived from the polyol polyester, the plasticizer, and the chain extender.

Specific embodiments of the present disclosure as illustrated in the following Examples are for illustrative purposes and are not limited to the materials, conditions, or process parameters set forth in these embodiments.

EXAMPLE 1

Preparation of Polyester Resin from Succinic Acid and 1,3-propanediol to Obtain poly-(1,3-propylene-succinate) of Formula 1, Where R is ethylene ($CH_2CH_2$), Subunit a is about 100 Mole % of the Polyester Resin, Subunit b is 0 mole % of the Polyester Resin, and Subunit c is 0 Mole % of the Polyester Resin To a 300 milliliter three-necked round bottom flask equipped with a mechanical stirrer were added 155 grams of succinic acid, 130 grams of 1,3-propanediol and 0.1 grams of titanium (iv) isopropoxide (Tyzor TE) catalyst. The reaction mixture was kept under constant nitrogen flow of about 5 standard cubic feet per minute (scfm) and then heated to 140° C. during a 30-minute period. The resulting mixture was then stirred at 200 rpm, and the temperature was increased by 10° C. every 15 minutes until the temperature reached 200° C. Samples (about 2 grams) were taken every 20 minutes using a glass pipette and were measured for viscosity using a Brookfield CAP2000 Viscometer at 70° C. and a spindle rate of 100 rpm. When a viscosity of about 4,250 centipoise was obtained, the mixture was poured into a metal pan and allowed to cool to room temperature. The acid value of the obtained polyester resin was 0.93 milligrams of KOH/gram, and the hydroxyl number was 36.1 milligrams of KOH/gram.

EXAMPLE 2

Preparation of Polyester Resin from Succinic Acid, 1,3-propanediol and 12-hydroxystearic Acid to obtain copoly-(1,3-propylene-succinate)-copoly-(12-stearate) of Formula 1, Where R is Ethylene ($CH_2CH_2$), Subunit a is About 92.5 Mole % of the Polyester Resin, Subunit b is About 7.5 Mole % of the Polyester Resin, and Subunit c is 0 Mole % of the Polyester Resin To a 5 L three-necked round bottom flask equipped with a mechanical stirrer and distillation apparatus were added 2.65 kg (22.44 moles) of succinic acid, 1.878 kg (24.6 moles) of 1,3-propanediol, 564 grams (1.82 moles) of 12-hydroxystearic acid and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then taken every 30 minutes until a viscosity of about 2,010 centipoise (as measured by a Brookfield CAP2000 Viscometer at 70° C. and a spindle rate of 100 rpm) was obtained. The mixture was then discharged into a metal pan. The acid value of the obtained polyester resin was 1.56 milligrams of KOH/gram, and the hydroxyl number was 54 milligrams of KOH/gram.

EXAMPLE 3

Preparation of Polyester Resin from Succinic Acid, 1,3-propanediol and Rosin Diol to Obtain copoly-(1,3-propylene-succinate)-copoly-(glyceryl rosin-succinate) of Formula 1, Where R is Ethylene (CH$_2$CH$_2$), Subunit a is About 95 Mole % of the Polyester Resin, Subunit b is 0 Mole % of the Polyester Resin, and Subunit c is about 5 Mole % of the Polyester Resin To a 1 L three-necked round bottom flask equipped with a mechanical stirrer and distillation apparatus were added 383.8 grams (3.2 moles) of succinic acid, 296.7 grams (3.8 moles) of 1,3-propanediol, 123.8 grams (0.36 moles) of rosin diol available as Altamer RDA from Ingevity and 2 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then taken every 30 minutes until a viscosity of about 3429 centipoise (as measured by a Brookfield CAP2000 Viscometer at 70° C. and a spindle rate of 100 rpm) was obtained. The mixture was then poured into a metal pan and allowed to cool to room temperature. The resulting polyester resin had an acid value of 1.07 milligrams of KOH/gram, and a hydroxyl number of 45.9 milligrams of KOH/gram.

EXAMPLE 4

Preparation of Polyester Resin from Succinic Acid, 1,3-propanediol and Rosin Diol to Obtain copoly-(1,3-propylene-succinate)-copoly-(glyceryl rosin-succinate) of Formula 1, where R is Ethylene (CH$_2$CH$_2$), Subunit a is About 73 Mole % of the Polyester Resin, Subunit b is 0 Mole % of the Polyester Resin, and Subunit c is About 23 Mole % of the Polyester Resin To a 500 mL three-necked round bottom flask equipped with a mechanical stirrer and distillation apparatus were added 162.37 grams (1.37 moles) of succinic acid, 104.62 grams (1.4 moles) of 1,3-propanediol, 142 grams (0.41 moles) of rosin diol available as Altamer RDA from Ingevity and 2 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then taken every 30 minutes until a viscosity of about 6550 centipoise (as measured by a Brookfield CAP2000 Viscometer at 70° C. and a spindle rate of 100 rpm) was obtained. The mixture was then poured into a metal pan and allowed to cool to room temperature. The resulting polyester resin had an acid value of 1.31 milligrams of KOH/gram, and a hydroxyl number of 31.0 milligrams of KOH/gram.

EXAMPLE 5

Preparation of Polyester Resin from Succinic Acid, 1,3-propanediol and 12-hydroxystearic Acid to Obtain copoly-(1,3-propylene-succinate)-copoly-(12-stearate) of Formula 1, where R is Ethylene (CH$_2$CH$_2$), Subunit a is About 70 Mole % of the Polyester Resin, Subunit b is About 30 Mole % of the Polyester Resin, and Subunit c is 0 Mole % of the Polyester Resin To a 5 L three-necked round bottom flask equipped with a mechanical stirrer and distillation apparatus were added 2.1 kg (17.78 moles) of succinic acid, 1.475 kg (19.38 moles) of 1,3-propanediol, 1.35 kg (4.5 moles) of 12-hydroxystearic acid and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then taken every 30 minutes until an acid value of 0.85 milligrams of KOH/gram was measured, and the mixture was then poured into a metal pan and allowed to cool to room temperature. The resulting polyester resin had a hydroxyl number of 35.4 milligrams of KOH/gram.

EXAMPLE 6

Preparation of Polyester Resin from Succinic Acid, Sebacic Acid, 1,3-propanediol and 12-hydroxystearic Acid to Obtain terpoly-(1,3-propylene-succinate)-terpoly-(12-stearate)-terpoly-(1,3-propylene-sebacate) of Formula 1, where R is a Mixture of Ethylene (CH2CH2) and Octylene ((CH2)8) with a Ratio of 12:1, Subunit a is about 90 Mole % of the Polyester Resin, Subunit b is about 10 Mole % of the Polyester Resin, and Subunit c is 0 Mole % of the Polyester Resin To a 5 L three-necked round bottom flask equipped with a mechanical stirrer and distillation apparatus were added 2.45 kg (20.75 moles) of succinic acid, 345 grams (1.71 moles) of sebacic acid, 1.721 kg (22.6 moles) of 1,3-propanediol, 691 grams (2.3 moles) of 12-hydroxystearic acid and 5 grams of ORGATIX TC-400 titanium (IV) catalyst. The reaction mixture was kept under constant nitrogen flow of about 0.5 liters per minute (L/min) and heated to 140° C. during a 30-minute period. The mixture was then stirred at 275 rpm, and the temperature was increased by 10° C. every 30 minutes until the temperature reached 180° C. The temperature was maintained at 180° C. for 12 hours and the water byproduct was collected in the distillation receiver. The mixture was then heated to 200° C. during a 30-minute period, during which both water and excess diol were collected in the distillation receiver. Samples (about 2 grams) were then taken every 30 minutes until an acid value of 1.22 milligrams of KOH/gram was measured, and the mixture was then poured into a metal pan and allowed to cool to room temperature. The resulting polyester resin had a hydroxyl number of 43.9 milligrams of KOH/gram.

EXAMPLES 7 to 9

General Procedure for Preparation of an Aqueous Polyurethane Dispersion, Whereby the Chain Extender is Added Before Phase Inversion To a 1 L three-necked round bottom flask equipped with a mechanical stirrer was added 0.5 moles of polyester resin of Example 1, which was heated to 80° C. while mixing under nitrogen atmosphere. Once the material reached 80° C., 1.2 moles of diisocyanate (namely, isophorone diisocyanate (IPDI), 1,5-pentamethylene diisocyanate (PM), hexamethylene diisocyanate (HDI), or a mixture of IPDI and PM) was added dropwise using a pressure equalizing dropping funnel. The mixture was stirred at 275 rpm, and 0.005 moles of Dabco 33 LV catalyst (available from Evonik Industries) was added. The temperature was maintained at 82° C. for about 4 hours and until the viscosity reached from about 15,000 to about 20,000 centipoise. The mixture was then cooled to 75° C., at which time 0.022 moles of 2,2 bis (hydroxymethyl)propionic acid was added. The reaction was allowed to continue for 2 hours, and the viscosity was adjusted (lowered) by addition of 25 mL of an organic solvent (namely, methyl ethyl ketone (MEK)), followed by addition of 0.042 moles of lysine. After 30 minutes, another 25 mL of organic solvent was added followed by addition of another 0.042 moles of lysine. The reaction was allowed to continue for 3 hours at 75° C. and, during this time, the viscosity was again lowered twice by adding 25 mL of organic solvent. Triethylamine (0.023 moles) was then added to the mixture to neutralize hydrophilic moieties, followed by addition of 30 mL of organic solvent. After another 30 minutes of stirring, the stirrer speed was increased to 1,000 rpm and 270 grams of deionized water, preheated to 80° C., was added dropwise through a pressure equalizing dropping funnel. Once all the water had been added, the mixture was stirred for 1 hour at 75° C. Thereafter, the organic solvent was removed by distillation, and the resulting polyurethane dispersion was cooled to room temperature.

Films were then cast from the dispersion by pouring 40 g of polyurethane dispersion into a Teflon coated dish (14×0.4 cm, circular), followed by drying at room temperature for 24 hours and then in an oven at 100° C. for 8 hours.

The specific polyester resins (polyols), diisocyanates and organic solvents are listed in Table 1, together with the resulting properties of the dispersion and the resulting properties of the cast films.

TABLE 1

| Example | Polyol (Example) | Diisocyanate | Solvent | Solids % | Particle Size (nm) | Contact Angle (°) | Tensile Strength (MPa) | Modulus (MPa) |
| --- | --- | --- | --- | --- | --- | --- | --- | --- |
| 7 | 1 | IPDI | MEK | 41 | 198 | 28 | 1.75 | 1.83 |
| 8 | 1 | PM | MEK | 35 | 154 | 73 | 2.82 | 4.18 |
| 9 | 1 | IPDI/PM (1:1) | MEK | 35 | 205 | 49 | 3.2 | 2.63 |
| 10 | 3 | IPDI | MEK | 35 | 222 | 101 | 5.5 | 1.92 |
| 11 | 4 | IPDI | MEK | 35 | 170 | 97 | 3.01 | 1.89 |
| 12 | 1 | PM | MEK | 35 | 186 | 55 | 4.81 | 3.78 |
| 13 | 2 | IPDI | Acetone | 35 | 190 | 96 | 5.5 | 4.2 |
| 14 | 5 | IPDI | Acetone | 35 | 200 | 108 | 6.7 | 5.9 |
| 15 | 1 | IPDI | Acetone | 45 | 238 | 37 | 7.7 | 7.7 |
| 16 | 3 | IPDI | Acetone | 35 | 166 | 95 | 0.56 | 1.72 |
| 17 | 2 | IPDI | Acetone | 35 | 170 | 98 | 0.36 | 1.59 |
| 18 | 1 | HDI | Acetone | 35 | 190 | 70 | 4.0 | 3.36 |

IPDI (Isophorone Diisocyanate);
HDI (Hexamethylene Diisocyanate);
PM (1,5-pentamethylene diisocyanate);
Methyl Ethyl Ketone (MEK).

EXAMPLES 10 to 18

General Procedure for Preparation of an Aqueous Polyurethane Dispersion, Whereby the Chain Extender is Added Before Phase Inversion To a 1 L three-necked round bottom flask equipped with a mechanical stirrer was added 0.5 moles of one of the polyester resins of Examples 1 to 5, which was heated to 80° C. while mixing under nitrogen atmosphere. Once the material reached 80° C., 0.12 moles of diisocyanate was added dropwise using a pressure equalizing dropping funnel. The mixture was stirred at 275 rpm, and 0.005 moles of Orgatix TC-400 catalyst (available from Matsumoto Fine Chemical) was added.

The temperature was maintained at 82° C. for about 2.5 hours, until the viscosity reached from about 18,000 to about 24,000 centipoise. The mixture was then cooled to 75° C. and 0.022 moles of 2,2 bis (hydroxymethyl)propionic acid was added. The reaction was then allowed to continue for 2 hours, after which the reaction temperature was allowed to cool to about 55° C. The viscosity was then adjusted (lowered) by the addition of 40 mL of organic solvent (either MEK or acetone). Triethylamine (0.023 moles) was then added to the mixture to neutralize hydrophilic moiety, followed by addition of 50 mL of organic solvent. After 30 minutes of stirring, the mixture was cooled to about 10° C. Separately, in a 500 mL Pyrex beaker, 0.042 moles of lysine was dissolved in 270 mL deionized water and cooled to 10° C. Once the mixture in the beaker reached 15° C., the stirrer speed was set to 1000 rpm and the cooled lysine/water solution was added to the reaction mixture over a 5 minute period and allowed to mix for 4 hours to complete the polymerization. Thereafter, the organic solvent was removed by distillation, and the resulting polyurethane dispersion was cooled to room temperature.

Films were then cast from the dispersion by pouring 40 g of polyurethane dispersion into a Teflon coated dish (14×0.4 cm, circular), followed by drying at room temperature for 24 hours and then in an oven at 100° C. for 8 hours.

The specific polyester resins (polyols), diisocyanates and organic solvents are listed in Table 1, together with the resulting properties of the dispersion and the resulting properties of the cast films.

EXAMPLE 19

General Preparation of Plant-based Leather Utilizing a Surface Foam Layer and Topcoat Layer Thereover To 160 grams of the polyurethane dispersion of Example 12 were added 6.4 g of Ortegol P4 (available from Evonik Industries) and 4.8 g of Ortegol PV 301 (available from Evonik Industries). The mixture was stirred at 1600 rpm until frothing was observed. The froth (foam) was then deposited onto a cotton canvas substrate using a doctor blade coater, followed by drying in an oven at 80° C. for 20 minutes and then at 100° C. for 10 minutes. The final thickness of the foam layer was between 0.2 and 0.5 mm.

A topcoat layer was then formed by pouring the polyurethane dispersion of Example 17 onto the foam layer, and spreading the poured polyurethane dispersion using a doctor blade coater to form a topcoat layer of between 0.01 and 0.02 mm thickness. The topcoat layer was observed to have a higher hydrophobicity than the uncoated foam layer.

EXAMPLES 20 to 23

General Preparation of Plant-based Leather Utilizing a Binder Layer, Followed by a Surface Foam Layer Thereover and a Topcoat Layer Over the Surface Foam Layer The polyurethane dispersion Example 15 or 16 was deposited onto a substrate (cotton canvas, cotton twill or cotton spandex) using a doctor blade coater, followed by drying in an oven at 80° C. for 20 minutes, to yield a binder layer of about 0.02 mm thickness.

A surface foam layer was then prepared by adding, to 150 g of the polyurethane dispersion of Example 12 or 16, 6.4 g of Ortegol P4 (Evonik Industries) and 4.8 g of Ortegol PV 301 (Evonik Industries). The mixture was stirred at 1600 rpm until frothing was observed. The froth (foam) was then deposited directly onto the binder layer on the substrate using a doctor blade coater, followed by drying in an oven at 80° C. for 20 minutes and then at 100° C. for 10 minutes. The final thickness of the foam layer was between 0.2 and 0.5 mm.

A topcoat layer was then formed by pouring the polyurethane dispersion of Example 16 or 17 onto the foam layer, and spreading the poured polyurethane dispersion using a doctor blade coater to form a topcoat layer of between 0.01 and 0.02 mm thickness.

The specific polyurethane binder, surface foam and topcoat and substrate are listed in Table 2.

TABLE 2

| | | Plant based Leather Alternative | | |
| | | Polyurethane Dispersion as binder ($1^{st}$ layer) | Polyurethane Dispersion as Surface Foam ($2^{nd}$ Layer) | Polyurethane Dispersion as Topcoat ($3^{rd}$ Layer) |
| Example | Substrate | | | |
| --- | --- | --- | --- | --- |
| 19 | CC | — | Example 12 | Example 17 |
| 20 | CT | Example 15 | Example 12 | Example 17 |
| 21 | CS | Example 16 | Example 12 | Example 17 |
| 22 | CC | Example 15 | Example 16 | Example 17 |
| 23 | CT | Example 15 | Example 12 | Example 16 |

Cotton Canvas (CC); Cotton Twill (CT); Cotton Spandex (CS)

The claims, as originally presented and as they may be amended, include alternatives, modifications, improvements, equivalents, and substantial equivalents of the disclosed embodiments and teachings, including those that are presently unforeseen, or unappreciated, and that, for example, may arise from applicants/patentees and others. Unless specifically recited in a claim, steps, or components of claims should not be implied, or imported from the specification, or any other claims as to any particular order, number, position, size, shape, angle, color, or material. Percent (%) by weight is a known quantity and is usually based on the total of the components present divided by the specific component present.

What is claimed is:

1. An aqueous polyurethane dispersion comprising particles of polyurethane in water, wherein the polyurethane is derived from an organic diisocyanate, a hydrophilic monomer, a neutralizer, a chain extender, and a polyester resin, the polyester resin being a random copolymer having randomly distributed subunits of formula 1:

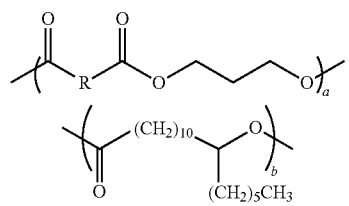

-continued

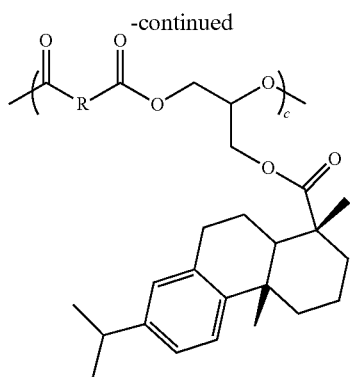

where:
R is ethylene, octylene, or decylene,
a is from about 40 to about 100 mole % of the polyester resin,
b is from 0 to about 30 mole % of the polyester resin,
c is from 0 to about 30 mole % of the polyester resin, and
a+b+c=100 mole % of the polyester resin,
wherein the polyester resin of formula 1 is derived from at least one organic diol selected from the group consisting of 1,3-propanediol, 1,2-propylene glycol, rosin diol, 1,4-butane diol, and 1,6-hexanediol, and
wherein the rosin diol is derived from at least one rosin acid selected from the group consisting of abietic acid, palustric acid, dehydroabietic acid, neo-abietic acid, levo-pimaric acid, pimaric acid, sandaracopimaric acid, iso-pimaric acid, tetrahydroabietic acid, and mixtures thereof.

2. The aqueous polyurethane dispersion of claim 1, wherein, in the polyester resin of formula 1:
a is from about 70 to about 100 mole % of the polyester resin,
b is from 0 to about 30 mole % of the polyester resin, and
c is from 0 to about 30 mole % of the polyester resin.

3. The aqueous polyurethane dispersion of claim 1, wherein the particles have a diameter of from about 50 to about 220 nanometers.

4. The aqueous polyurethane dispersion of claim 1, wherein the polyester resin of formula 1 has a number average molecular weight of from about 500 to about 5,000 grams per mole.

5. The aqueous polyurethane dispersion of claim 1, wherein the polyester resin of formula 1 has a glass transition temperature of from about −30oC to about 50oC.

6. The aqueous polyurethane dispersion of claim 1, wherein the particles of polyurethane are from about 10 to about 60 weight % of the dispersion, and water is from about 40 to about 90 weight % of the dispersion, where the sum of the weight percentages of the particles and water is 100 weight %.

7. The aqueous polyurethane dispersion of claim 1, wherein the polyester resin of formula 1 has a hydroxyl number of from about 30 to about 80 milligrams of KOH/gram.

8. The aqueous polyurethane dispersion of claim 1, wherein the polyester resin of formula 1 has an acid number of less than about 3 milligrams of KOH/gram.

9. The aqueous polyurethane dispersion of claim 1, wherein the polyester resin of formula 1 is further derived from at least one organic diacid selected from the group consisting of succinic acid, sebacic acid, dodecanedioic acid, and dimer organic diacid.

10. The aqueous polyurethane dispersion of claim 1, wherein said polyester resin of formula 1 is generated from reaction of an organic diacid, an organic acid-alcohol and the at least one organic diol, and wherein said organic diacid is selected from the group consisting of succinic acid and sebacic acid, said organic acid-alcohol is selected from the group consisting of 12-hydroxystearic acid and 1,12-dodecanedioic acid, and said at least one organic diol is selected from the group consisting of the 1,3-propanediol and the rosin diol.

11. The aqueous polyurethane dispersion of claim 1, wherein the polyester resin of formula 1 is further derived from an organic acid-alcohol that is 12-hydroxystearic acid.

12. The aqueous polyurethane dispersion of claim 1, wherein the polyester resin of formula 1 is derived from the 1,3 propanediol, succinic acid, 12-hydroxystearic acid, and the rosin diol.

13. The aqueous polyurethane dispersion of claim 1, wherein the organic diisocyanate is selected from the group consisting of 1,5 pentamethylene diisocyanate, diphenylmethane 4,4'-diisocyanate, isophorone diisocyanate, dicyclohexylmethane 4,4-diisocyanate, hexamethylene 1,6-diisocyanate, naphthalene 1,5-diisocyanate, and mixtures thereof.

14. The aqueous polyurethane dispersion of claim 1, wherein the hydrophilic monomer is selected from the group consisting of dimethylol propionic acid, 5-sulfoisophthalic acid sodium salt, dimethyl-5-sulfoisophthalic acid sodium salt, and mixtures thereof.

15. The aqueous polyurethane dispersion of claim 1, wherein the chain extender is selected from the group consisting of polyhydric alcohols, ethylene glycol, 1,3-propanediol, 1,4-butanediol, 1,6-hexanediol, isosorbide, polyhydric amines, ethylenediamine, 1,5-pentamethylene 1,6-hexamethylene diamine, lysine, hydrazine, the rosin diol, and mixtures thereof.

16. The aqueous polyurethane dispersion of claim 1, wherein the neutralizer is selected from the group consisting of ammonia, triethyl amine, trimethyl amine, tributyl amine, dimethyl amine, diethyl amine, and tri-ethanol amine.

17. The aqueous polyurethane dispersion of claim 1, wherein the polyurethane further comprises a surfactant.

18. The aqueous polyurethane dispersion of claim 17, wherein the surfactant is selected from the group consisting of a polyether-silicone oil, a silicone surfactant of sodium dodecylbenzene sulfonate, sodium dodecylnaphthalene sulfate, dialkyl benzenealkyl, adipic acid, polyvinyl alcohol, polyacrylic acid, methalose, methyl cellulose, and ethyl cellulose, and bioloop.

19. The aqueous polyurethane dispersion of claim 1, wherein the polyurethane further comprises a colorant.

20. The aqueous polyurethane dispersion of claim 19, wherein the colorant is dye or pigment.

21. A polymeric film formed by coating a substrate with the aqueous polyurethane dispersion of claim 1, wherein after coating the substrate, the substrate is heated from about 80° C. to about 120° C. to form the polymeric film.

22. The polymeric film of claim 21, wherein the polymeric film has a contact angle of from about 70° to about 150°.

23. The polymeric film of claim 21, wherein the polymeric film has a hardness value of from about 15 to about 60 Asker C, a tensile strength of from about 1 to about 10 MPa, a resilience of from about 25 to about 60%, an elongation at break of from about 150 to about 700%, and a tear strength of from about 2 to about 4 N/mm$^2$.

24. The polymeric film of claim 21, wherein the bio-content of the polyurethane is from about 70 to about 85%.

25. An artificial leather comprising:
a fabric layer;
a binder layer on the fabric layer;
a foam layer on the binder layer; and
a topcoat layer on the foam layer, wherein the binder layer, the foam layer and the topcoat layer are each formed from the aqueous polyurethane dispersion of claim 1.

26. The artificial leather of claim 25, wherein the binder layer has a thickness of from about 0.01 to about 0.03 mm, the foam layer has a thickness of from about 0.05 to about 0.5 mm. and the topcoat layer has a thickness of from about 0.01 to about 0.03 mm.

27. An aqueous polyurethane dispersion comprising particles of polyurethane in water, wherein the polyurethane is derived from an organic diisocyanate, a hydrophilic monomer, a neutralizer, a chain extender, and a polyester resin, the polyester resin being a random copolymer having randomly distributed subunits of formula 1:

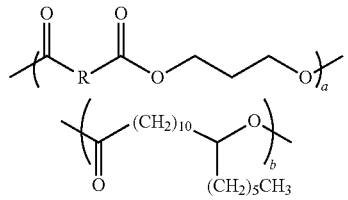

-continued

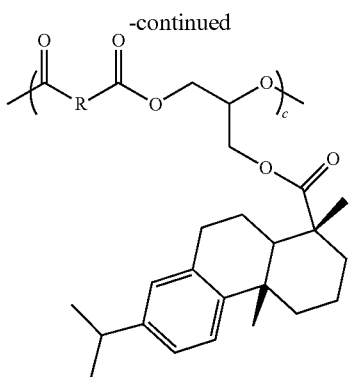

where:
R is ethylene, octylene, or decylene,
a is from about 40 to about 100 mole % of the polyester resin,
b is from 0 to about 30 mole % of the polyester resin,
c is from 1 to about 30 mole % of the polyester resin, and
a+b+c=100 mole % of the polyester resin,
wherein the polyester resin of formula 1 is derived from a rosin diol derived from at least one rosin acid selected from the group consisting of abietic acid, palustric acid, dehydroabietic acid, neo-abietic acid, levo-pimaric acid, pimaric acid, sandaracopimaric acid, iso-pimaric acid, tetrahydroabietic acid, and mixtures thereof.

* * * * *